United States Patent
Bergner et al.

(10) Patent No.: US 12,286,361 B2
(45) Date of Patent: Apr. 29, 2025

(54) LITHIUM NICKEL OXIDE PARTICULATE MATERIAL, METHOD FOR ITS MANUFACTURE AND USE

(71) Applicant: BASF SE, Ludwigshafen am Rhein (DE)

(72) Inventors: Benjamin Johannes Herbert Bergner, Ludwigshafen (DE); Heino Sommer, Ludwigshafen (DE); Pascal Hartmann, Ludwigshafen (DE); Tobias Maximilian Teufl, Poing (DE)

(73) Assignee: BASF SE, Ludwigshafen am Rhein (DE)

( * ) Notice: Subject to any disclaimer, the term of this patent is extended or adjusted under 35 U.S.C. 154(b) by 836 days.

(21) Appl. No.: 17/595,329

(22) PCT Filed: Jun. 17, 2020

(86) PCT No.: PCT/EP2020/066814
§ 371 (c)(1),
(2) Date: Nov. 15, 2021

(87) PCT Pub. No.: WO2020/260102
PCT Pub. Date: Dec. 30, 2020

(65) Prior Publication Data
US 2022/0212950 A1    Jul. 7, 2022

(30) Foreign Application Priority Data
Jun. 28, 2019 (EP) .................... 19183347

(51) Int. Cl.
*C01G 53/42* (2025.01)
*H01M 4/02* (2006.01)
(Continued)

(52) U.S. Cl.
CPC ............ *C01G 53/42* (2013.01); *H01M 4/525* (2013.01); *H01M 10/0525* (2013.01); *C01P 2006/40* (2013.01); *H01M 2004/027* (2013.01)

(58) Field of Classification Search
None
See application file for complete search history.

(56) References Cited

U.S. PATENT DOCUMENTS

| | | |
|---|---|---|
| 5,620,812 A | 4/1997 | Tahara et al. |
| 9,698,420 B2 | 7/2017 | Ishizaki et al. |
| (Continued) | | |

FOREIGN PATENT DOCUMENTS

| | | |
|---|---|---|
| CN | 107732179 A | 2/2018 |
| CN | 107742717 A | 2/2018 |
| (Continued) | | |

OTHER PUBLICATIONS

Alderliesten et al., "Mean Particle Diameters Part II: Standardization of Nomenclature", Part. Part. Syst. Charact., vol. 8, pp. 237-241 (1991).

(Continued)

*Primary Examiner* — John J Figueroa
(74) *Attorney, Agent, or Firm* — Armstrong Teasdale LLP

(57) ABSTRACT

Particulate material of the composition $Li_{1+x}TM_{1-x}O_2$ wherein x is in the range of from −0.02 to +0.05, TM comprises at least 93 mol-% nickel and (A) at least one element $M^1$ wherein $M^1$ is selected from Nb, Ta, Ti, Zr, W and Mo, (B) at least one element $M^2$ wherein $M^2$ is selected from B, Al, Mg and Ga, wherein said particulate material has an average particle diameter (D50) in the range of from 2 to 20 µm.

11 Claims, 6 Drawing Sheets

Capacity-cycle plot of a coin half-cell containing the inventive cathode active material CAM.2 obtained by applying the cycling procedure listed in table 1.

(51) Int. Cl.
H01M 4/525 (2010.01)
H01M 10/0525 (2010.01)

(56) References Cited

U.S. PATENT DOCUMENTS

| | | | |
|---|---|---|---|
| 10,418,626 B2 | 9/2019 | Kawakita et al. | |
| 11,831,013 B2 | 11/2023 | Aoki et al. | |
| 12,191,484 B2 * | 1/2025 | Han | H01M 4/525 |
| 2003/0047717 A1 | 3/2003 | Kim et al. | |
| 2009/0081548 A1 | 3/2009 | Nakura | |
| 2010/0176337 A1 * | 7/2010 | Zhamu | H01M 4/587 |
| | | | 977/734 |
| 2011/0165463 A1 * | 7/2011 | Chang | H01M 4/525 |
| | | | 429/223 |
| 2011/0269018 A1 | 11/2011 | Kono et al. | |
| 2013/0171523 A1 | 7/2013 | Chen et al. | |
| 2018/0062173 A1 * | 3/2018 | Jo | C01G 51/42 |
| 2019/0386294 A1 * | 12/2019 | Han | H01M 4/131 |
| 2020/0203727 A1 * | 6/2020 | Yanagihara | H01M 4/505 |
| 2021/0005875 A1 * | 1/2021 | Lee | H01M 4/62 |
| 2021/0135187 A1 * | 5/2021 | Park | H01M 10/0525 |
| 2022/0102715 A1 | 3/2022 | Seo et al. | |
| 2022/0397613 A1 | 12/2022 | Jee et al. | |
| 2023/0249982 A1 * | 8/2023 | Sommer | H01M 4/505 |
| | | | 429/223 |

FOREIGN PATENT DOCUMENTS

| | | |
|---|---|---|
| CN | 107799740 A | 3/2018 |
| CN | 108767239 A | 11/2018 |
| EP | 3439084 A1 | 2/2019 |
| JP | 2017193471 A | 10/2014 |
| KR | 2016 0045029 | 4/2016 |
| KR | 1020160046029 A | 4/2016 |

OTHER PUBLICATIONS

Dubarry et al., "Best practices for incremental capacity analysis", Front. Energy Res. 10:1023555, 8 pages (2022).

Genovese et al., "Particle Size Determination of Food Suspensions: Application to Cloudy Apple Juice", Journal of Food Process Engineering, vol. 23, pp. 437-452 (2000).

Kwon et al., "Electrochemical properties of $LiNiO_2$ substituted by Al or Ti for Ni via the combustion method", Ceramics International, vol. 40, pp. 14141-14147 (2014).

Li et al., "Is Cobalt Needed in Ni-Rich Positive Electrode Materials for Lithium Ion Batteries?", Journal of the Electrochemical Society, vol. 166, No. 4, pp. A429-A439 (2019).

Park et al., "Electrochemical properties of $LiNiO_2$ and $LiNiO_2$ substituted with Ga, Al and/or Ti", Journal of Industrial and Engineering Chemistry, vol. 16, pp. 698-702 (2010).

Song et al., "Cycling performance of $LiNi_{1-y}M_yO_2$ (M=Ni, Ga, Al and/or Ti) synthesized by wet milling and solid-state method", Met. Mater. Int., vol. 18, No. 3, pp. 465-472 (2012).

Xie et al., "A Mg-Doped High-Nickel Layered Oxide Cathode Enabling Safer, High-Energy-Density Li-Ion Battieries", Chem. Mater., vol. 31, pp. 938-946 (2019).

Yoon et al., "Cation Ordering of Zr-Doped $LiNiO_2$ Cathode for Lithium-Ion Batteries", Chem. Mater., vol. 30, pp. 1808-1814 (2018).

International Search Report dated Sep. 23, 2020, PCT/EP2020/066814.

Barsoukov et al., "Comparison of kinetic properties of $LiCoO_2$ and $LiTi_{0.0}$"$_{5}Mg_{0}$"..., Solid State Ionics, North Holland Pub., vol. 161, No. 1-2, pp. 19-29, Jul. 1, 2003.

Chowdari et al., Cathodic behavior of (Co., Ti, Mg)-doped ..., Solid State Ionics, North Holland Pub. Co., vol. 140, No. 1-2, pp. 55-62, Mar. 1, 2001.

Yu et al, "Synthesis and properties of $LiGa"xMg"yNi"1"-"x" "yO"2$ as cathode ... , Solid State Ionics, North Holland Pub. Co., vol. 135, No. 1-4, pp. 131-135, Nov. 1, 2000.

* cited by examiner

Figure 1: Illustrating the calculation of the integral peak width $^{2nd\ charge}IPW_{4.1\ V\ -\ 4.25\ V}$ of the second charge at 0.2 C-rate between 4.1 V and 4.25 V.
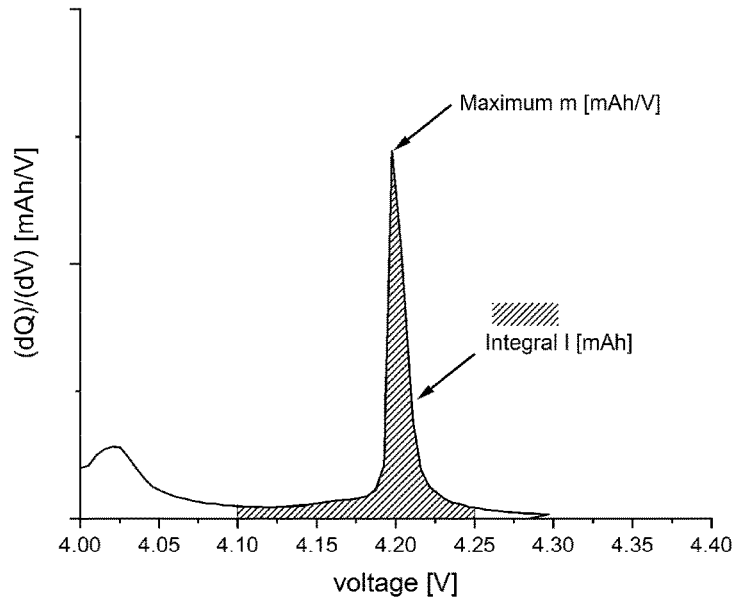
Figure 2: Differential capacity plot (dQ)/(dV) of the second cycle of a coin half-cell containing C-CAM.1
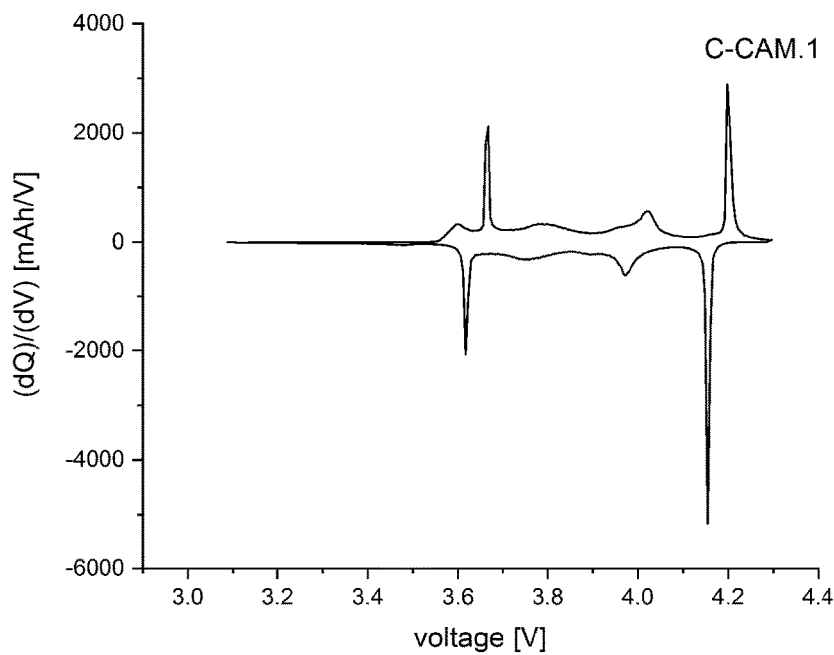

Figure 3: Differential capacity plot (dQ)/(dV) of the second cycle of a coin half-cell containing CAM.2
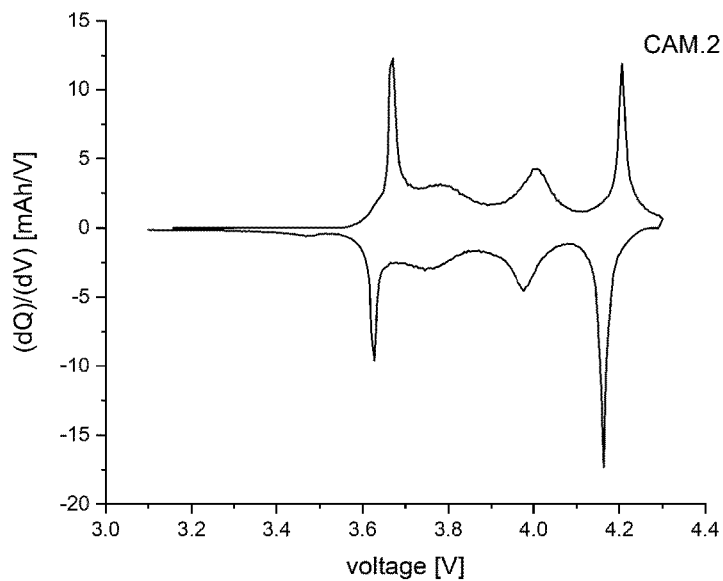
Figure 4: Differential capacity plot (dQ)/(dV) of the second cycle of a coin half-cell containing CAM.3
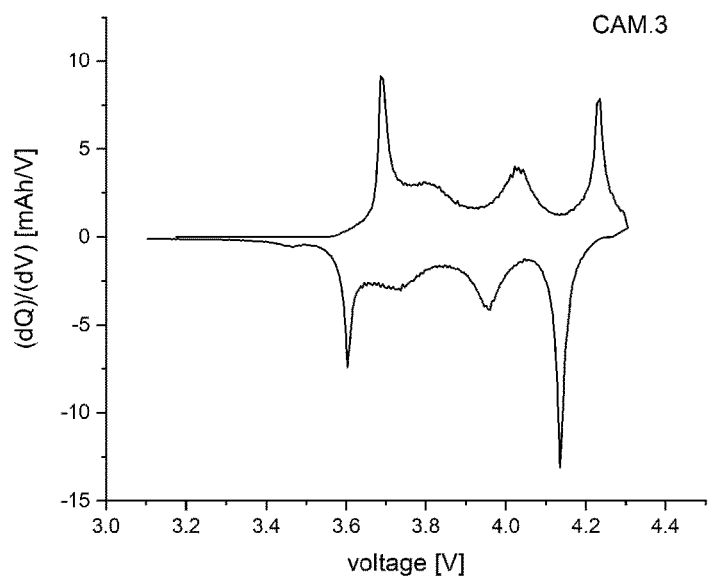

Figure 5: Differential capacity plot (dQ)/(dV) of the second cycle of a coin half-cell containing CAM.4
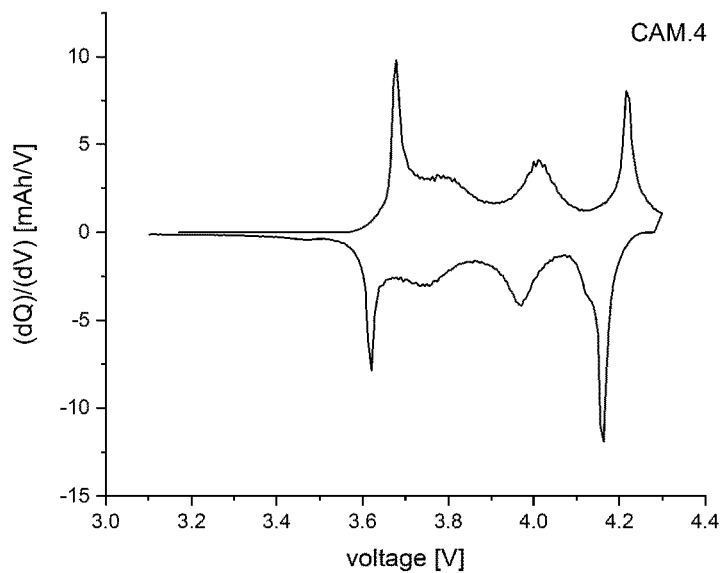
Figure 6: Differential capacity plot (dQ)/(dV) of the second cycle of a coin half-cell containing C-CAM.5
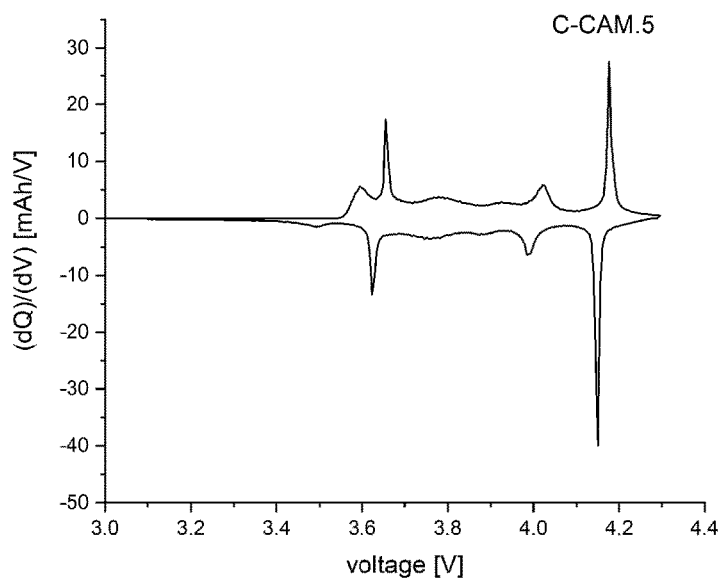

Figure 7: Capacity-cycle plot of a coin half-cell containing the comparative cathode active material C-CAM.1 obtained by applying the cycling procedure listed in table 1.
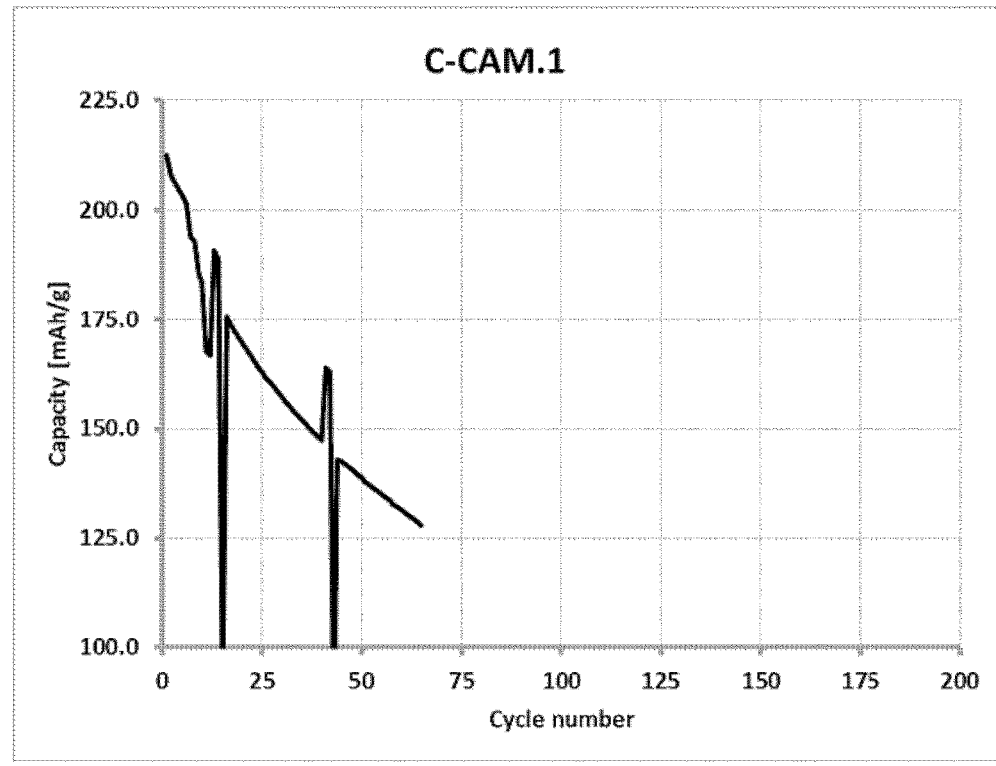
Figure 8: Capacity-cycle plot of a coin half-cell containing the inventive cathode active material CAM.2 obtained by applying the cycling procedure listed in table 1.
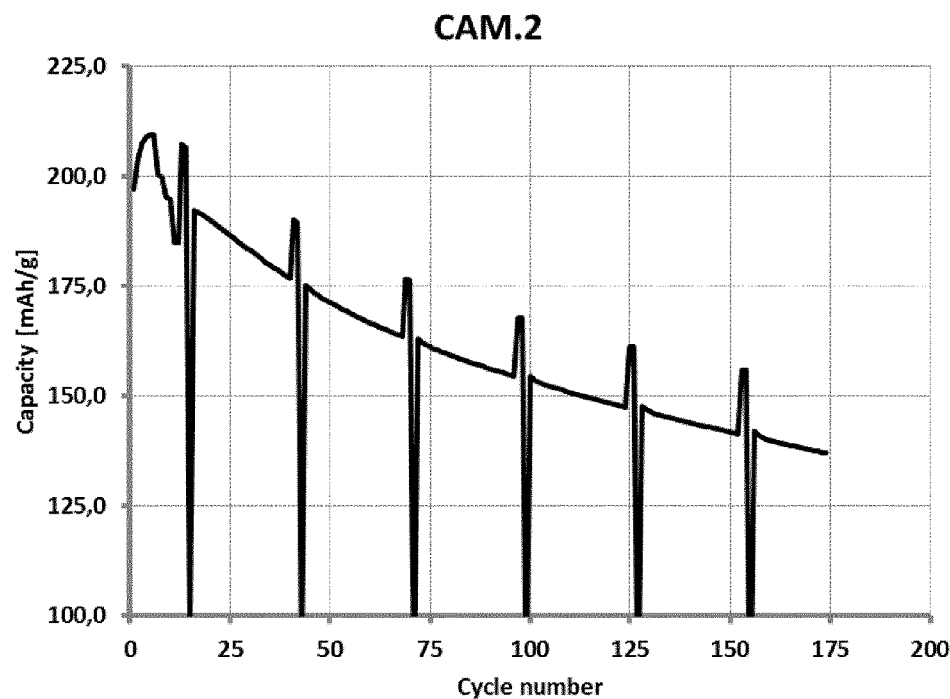

Figure 9: Capacity-cycle plot of a coin half-cell containing the inventive cathode active material CAM.3 obtained by applying the cycling procedure listed in table 1.
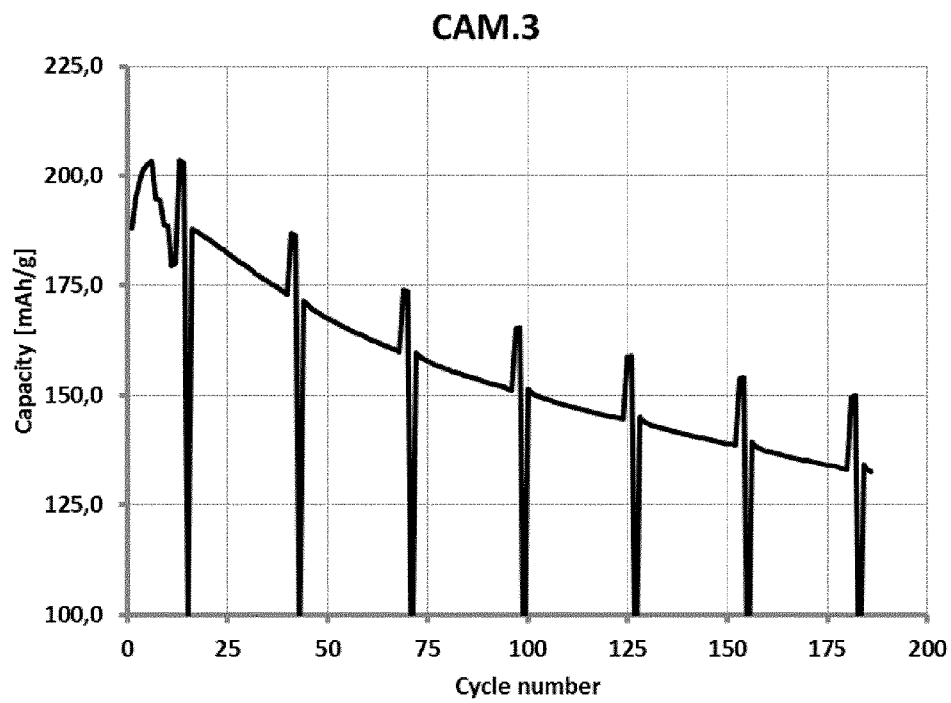
Figure 10: Capacity-cycle plot of a coin half-cell containing the inventive cathode active material CAM.4 obtained by applying the cycling procedure listed in table 1.
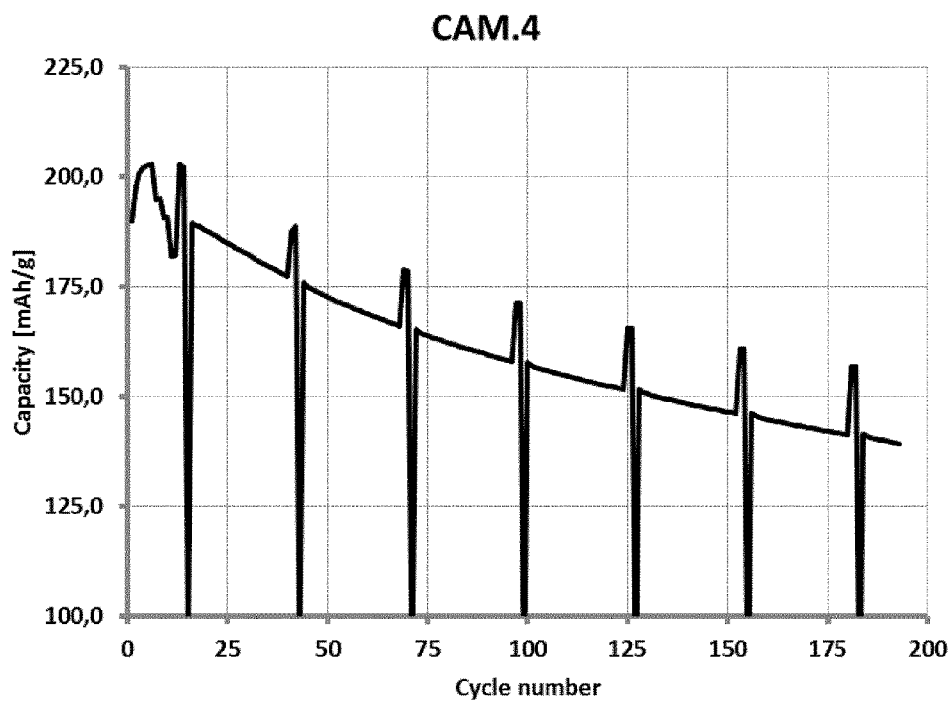

Figure 11: Capacity-cycle plot of a coin half-cell containing the inventive cathode active material C-CAM.5 obtained by applying the cycling procedure listed in table 1.
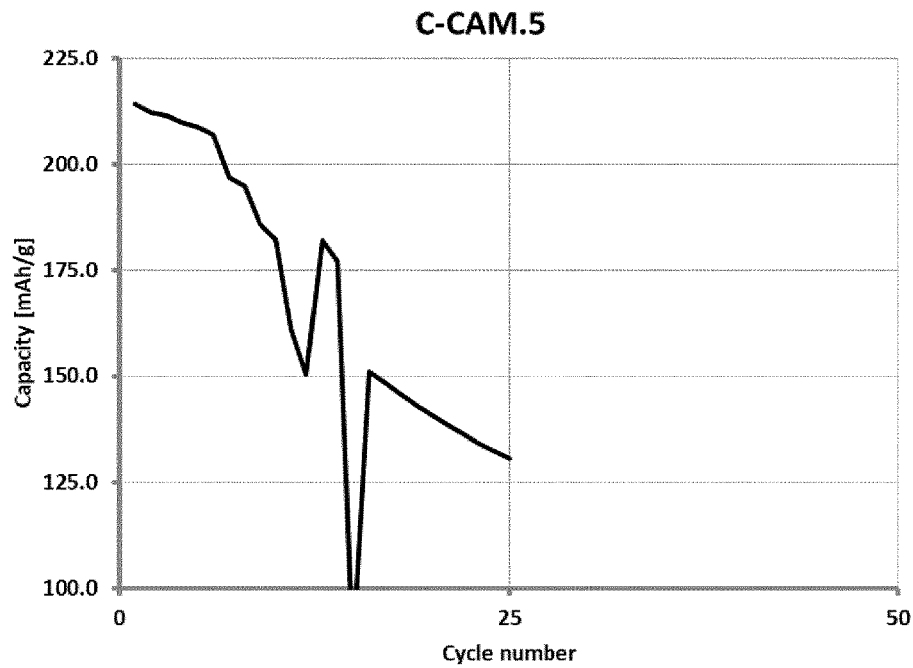
Figure 12: Resistance-cycle plot of coin half-cells containing C-CAM.1 or C-CAM.5 or one of the inventive cathode active materials CAM.2, CAM.3, M.3, CAM.4.
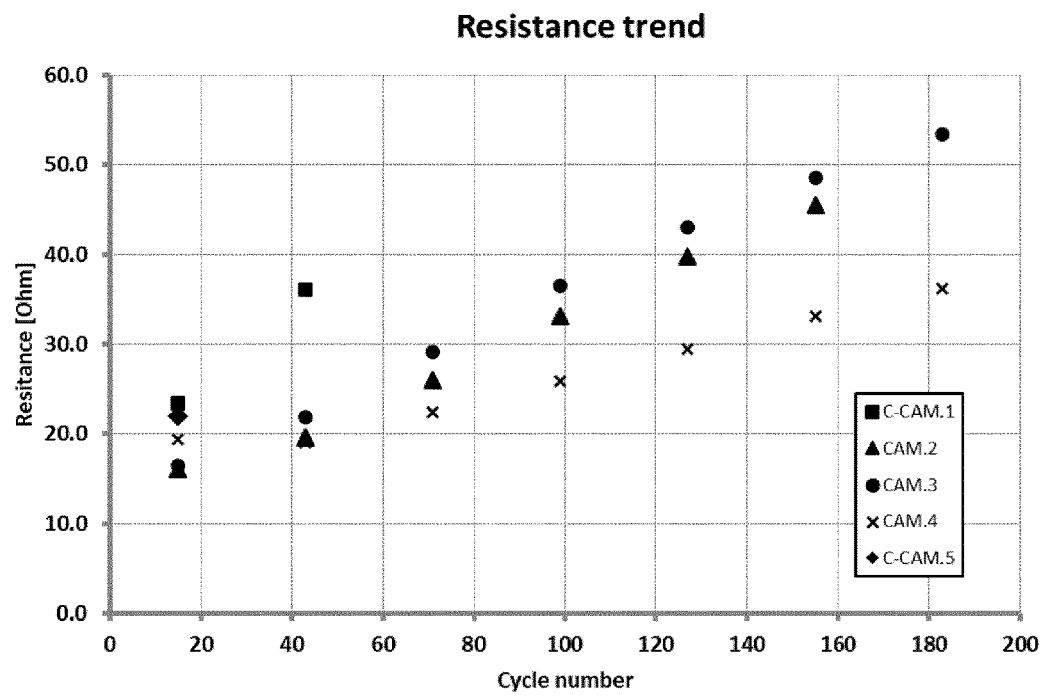

LITHIUM NICKEL OXIDE PARTICULATE MATERIAL, METHOD FOR ITS MANUFACTURE AND USE

This application is a national stage filing under 35 U.S.C. § 371 of International Application No. PCT/EP2020/066814, filed on Jun. 17, 2020, which claims the benefit of priority to European Application No. 19183347.4, filed Jun. 28, 2019; the disclosure of each of these applications are each incorporated herein by reference in their entirety.

The present invention is directed towards a particulate material of the composition $Li_{1+x}TM_{1-x}O_2$ wherein x is in the range of from −0.02 to +0.05,
TM comprises at least 93 mol-% nickel and
(A) at least one element $M^1$ wherein $M^1$ is selected from Nb, Ta, Ti, Zr, W and Mo,
(B) at least one element $M^2$ wherein $M^2$ is selected from B, Al, Mg and Ga, wherein said particulate material has an average particle diameter (D50) in the range of from 2 to 20 µm.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many electrode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$—and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1,000° C. During the thermal treatment a solid state reaction takes place, and the electrode active material is formed. In cases hydroxides or carbonates are used as precursors the solid state reaction follows a removal of water or carbon dioxide. The thermal treatment is performed in the heating zone of an oven or kiln.

In order to improve the capacity of cathode active materials, it has been suggested to select as high a nickel content as possible. However, in materials such as $LiNiO_2$, it has been observed that poor cycle life, pronounced gassing and a strong increase of the internal resistance during cycling provide high challenges for a commercial application.

Accordingly, the particulate material as defined at the outset has been found, hereinafter also defined as inventive material or as material according to the current invention. The inventive material shall be described in more detail below.

Inventive material as a composition according to the formula $Li_{1-x}TM_{1-x}O_2$ wherein x is in the range of from −0.02 to +0.05,
TM comprises at least 93 mol-% nickel and
(A) at least one element $M^1$ wherein $M^1$ is selected from Nb, Ta, Ti, Zr, W, and Mo,
(B) at least one element $M^2$ wherein $M^2$ is selected from B, Al, Mg and Ga, wherein said particulate material has an average particle diameter (D50) in the range of from 2 to 20 µm.

This corresponds to the formula $Li_{1-x}TM_{1-x}O_2$ wherein TM is $(Ni_{1-x1-x2}M^1_{x1}M^2_{x2})$ with x1>0 and x2>0 and x1+x2≤0.07.

The inventive material will be described in more detail below.

In one embodiment of the present invention, inventive material is comprised of spherical particles, that are particles having a spherical shape. Spherical particles shall include not just those which are exactly spherical but also those particles in which the maximum and mini-mum diameter of at least 90% (number average) of a representative sample differ by not more than 10%.

The inventive material has an average particle diameter (D50) in the range of from 2 to 20 µm, preferably from 5 to 16 µm. The average particle diameter can be determined, e.g., by light scattering or LASER diffraction or electroacoustic spectroscopy. The particles are usually composed of agglomerates from primary particles, and the above particle diameter refers to the secondary particle diameter.

In one embodiment of the present invention, the inventive material is comprised of secondary particles that are agglomerates of primary particles. Preferably, the inventive material is comprised of spherical secondary particles that are agglomerates of primary particles. Even more preferably, inventive material is comprised of spherical secondary particles that are agglomerates of spherical primary particles or platelets.

In one embodiment of the present invention, primary particles of inventive material have an average diameter in the range from 1 to 2000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy, and XRD stands for X-ray diffraction.

In one embodiment of the present invention, the inventive material has a specific surface (BET), hereinafter also referred to as "BET surface", in the range of from 0.1 to 2.0 $m^2/g$. The BET surface may be determined by nitrogen adsorption after outgassing of the sample at 200° C. for 30 minutes or more and beyond this accordance with DIN ISO 9277:2010.

TM is mostly nickel, for example at least 93 mol-%, preferably at least 95 mol-%. An upper limit of 99.5 mol-% is preferred.

Some metals are ubiquitous metals such as sodium, calcium or zinc, but such traces will not be taken into account in the description of the present invention. Traces in this context will mean amounts of 0.05 mol-% or less, referring to the total metal content TM.

TM is a combination of metals according to general formula (I)

with
$M^3$ being selected from Mn and Co,
a being in the range of from 0.95 to 0.995, preferably 0.97 to 0.995, more preferably from 0.98 to 0.995,
b being in the range of from 0.002 to 0.04,
c being in the range of from 0.002 to 0.02, and
d being in the range of from zero to 0.02,
and a+b+c=1. In a preferred embodiment, b≤c.

$M^1$ is selected from Nb, Ta, Ti, Zr, W, and Mo, and $M^2$ is selected from B, Al, Mg and Ga.

In one embodiment of the present invention, $M^1$ is Zr or Ti and $M^2$ is Al.

In one embodiment of the present invention $M^1$ is Ta or Nb and $M^2$ is Al or B.

In one embodiment of the present invention, $M^1$ and $M^2$ are homogeneously dispersed within the inventive material. That means that $M^1$ and $M^2$ are about uniformly distributed over the particles of inventive material.

In one embodiment of the present invention, at least one of $M^1$ and $M^2$ are enriched in the particle boundaries of particles of inventive material.

In a specific embodiment of the present invention, secondary particles of inventive material are coated with a metal oxide, preferably with a metal oxide that does not serve as a cathode active material. examples of suitable metal oxides are $LiBO_2$, $B_2O_3$, $Al_2O_3$, $Y_2O_3$, $LiAlO_2$, $TiO_2$, $ZrO_2$, $Li_2ZrO_3$, $Nb_2O_5$, $LiNbO_3$, $Ta_2O_5$, $LiTaO_3$.

In one embodiment of the present invention, inventive material has an integral peak width in the differential capacity plot (dQ)/(dV) between 4.1 and 4.25 V of at least 25 mV in the second charge cycle by at 0.2 C rate. Such inventive materials are particularly useful because they show a superior cycling stability and reduced resistance growth compared to materials with a more narrow peak width.

The differential capacity plot is typically calculated by differentiating the capacity Q vs. voltage V according to Eq. 1:

$$(dQ)/(dV) = (Q_t - Q_{t-1})/(V_t - V_{t-1}) \quad \text{(Eq. 1)}$$

where $V_t$, $Q_t$, are voltage V and capacity Q measured at the time t, and $V_{t-1}$ and $Q_{t-1}$ are the corresponding voltage and capacity measured at the previous time t−1. At standard C rates of 0.1-1 C, data points are typically measured every 30 s-60 s, or after predefined voltage changes, for instance 5 mV. Data points can be additionally interpolated and smoothened by an appropriate software to improve the quality of the (dQ)/(dV) plot.

The integral peak width in the differential capacity (dQ)/(dV) of the second charge at 0.2 C-rate between 4.1 V and 4.25 V is defined by the integral I of the corresponding (dQ)/(dV) plot in the second charge between 4.1 V and 4.25 V divided by the maximum m of the corresponding (dQ)/(dV) plot in the second charge between 4.1 V and 4.25 V as illustrated in FIG. 1 and defined in Eq. 2.

$$^{2nd\ charge}IPW_{4.1\ V\text{-}4.25\ V} = I/m \quad \text{(Eq. 2)}$$

Inventive materials are particularly suitable as cathode active materials for lithium ion batteries. They combine good cycling stability with a high energy density.

In one embodiment of the present invention inventive cathode active material contains in the range of from 0.001 to 1% by weight $Li_2CO_3$, determined by titration as $Li_2CO_3$ and referring to said inventive material.

Another aspect of the present invention relates to a process for making inventive materials, hereinafter also referred to as inventive process or process according to the (present) invention. The inventive process comprises several steps, hereinafter also referred to as step (a), step (b) etc.

Steps (a) to (e) are characterized as follows:
(a) providing a particulate nickel hydroxide, nickel (II) oxide or nickel oxyhydroxide, (b) treating said nickel oxide/hydroxide with one or two solutions of compounds of $M^1$ and $M^2$,
(c) optionally, removing the solvent(s) from step (b),
(d) adding a source of lithium,
(e) treating the mixture obtained from step (d) thermally.

Steps (a) to (e) are described in more detail below.

In step (a), a particulate nickel hydroxide, nickel (II) oxide or nickel oxyhydroxide is provided, hereinafter altogether also referred to as nickel oxide/hydroxide. In the context of the present invention, the term nickel oxyhydroxide is not limited to stoichiometric NiOOH but to any compound of nickel that bears only oxide and hydroxide counterions and a maximum individual content of impurities of 2% by weight of metals such as Mn or Mg, referring to the total metal content of said nickel hydroxide, nickel (II) oxide or nickel oxyhydroxide. Preferably, nickel hydroxide, nickel (II) oxide or nickel oxyhydroxide has a maximum total impurity content of 2% by weight, referring to the total metal content of said nickel hydroxide, nickel (II) oxide or nickel oxyhydroxide.

The nickel oxide/hydroxide provided in step (a) has an average particle diameter (D50) in the range of from 2 to 20 μm, preferably from 4 to 16 μm. The average particle diameter can be determined, e. g., by light scattering or LASER diffraction or electroacoustic spectroscopy. The particles may be composed of agglomerates from primary particles, and the above particle diameter refers to the secondary particle diameter.

A preferred nickel oxide/hydroxide is freshly precipitated nickel hydroxide.

In one embodiment of the present invention, the nickel oxide/hydroxide provided in step (a) has a residual moisture content in the range of from 50 to 1,000 ppm, preferably from 100 to 400 ppm. The residual moisture content may be determined by Karl-Fischer titration.

In step (b), said nickel oxide/hydroxide with one or two solutions of $M^1$ and $M^2$. Suitable solvents depend on the kind of compound of $M^1$ and $M^2$.

Suitable compounds of $M^1$ are alkanolates or acetylacetonates of Ti, of Zr, of W, of Ta and of Nb, for example the ethoxides of Ti, Zr, Nb, W and of Ta, the isopropoxide of Ti and of Zr, the acetylacetonates of Zr, Mo and or W, the mixed acetylacetonate-ethoxide of Ta. Alkanolates of $M^1$ are well soluble in the corresponding alcohols. Examples of water-soluble compounds of $M^1$ are for instance but not limited to ammonium metatungstate (hydrate), ammonium orthomolybdate, ammonium heptamolybdate, ammonium dimolybdate, ammonium niobate oxalate, ammonium zirconium (IV) carbonate, either as such or as hydrates.

Suitable compounds of $M^2$ are $Al_2(SO_4)_3$, $KAl(SO_4)_2$, and $Al(NO_3)_3$, alkanolates of Al such as, but not limited to $Al(C_2H_5O)_3$, Al-tris-isopropoxide, $Mg(NO_3)_2$, $Mg(SO_4)_2$, $MgC_2O_4$, alkanolates of Mg such as, but not limited to $Mg(C_2H_5O)_2$, $NaBO_2$, $H_3BO_3$, $B_2O_3$, alkanolates of B such as, but not limited to B-tris-isopropoxide, $Ga(NO_3)_3$, $Ga_2(SO_4)_3$, alkanolates of Ga such as, but not limited to $Ga(CH_3O)_3$, Ga-tris-isopropoxide or mixed salts of at least 2 cations such as aluminum magnesium isopropoxide. A suitable solvent for $Al_2(SO_4)_3$, $KAl(SO_4)_2$, $Al(NO_3)_3$, $Mg(NO_3)_2$, $Mg(SO_4)_2$, $MgC_2O_4$, $NaBO_2$,$H_3BO_3$, $B_2O_3$, $Ga(NO_3)_3$, and $Ga_2(SO_4)_3$ is water. Alkanolates of $M^2$ are well soluble in the corresponding alcohols.

In one embodiment of the present invention, the counterions of $M^1$ and $M^2$ are the same or similar, e.g., two different alkanolate ions. In such embodiments, said nickel oxide/hydroxide may be treated with one solution that contains both $M^1$ and $M^2$.

In another embodiment of the present invention, the counterions of $M^1$ and $M^2$ are different, for example an alkoxide of $M^1$ and nitrate of Al. In such embodiments, said nickel oxide/hydroxide is treated subsequently with a solution that contain $M^1$ and with a solution that contains $M^2$.

In one embodiment of step (b), the solution used in step (b) contains 0.001 to 60% by weight of compounds of $M^1$ or $M^2$. In another embodiment of step (b), the solution used in step (b) contains in total 0.002 to 70% by weight of compounds of $M^1$ and $M^2$.

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with nickel oxide/hydroxide from step (a) followed by introduction of solution of compound of $M^1$ and/or $M^2$.

In another embodiment, such vessel is charged with a solution of compound of $M^1$ and/or $M^2$ followed by introduction of nickel oxide/hydroxide from step (a). In another embodiment, nickel oxide/hydroxide from step (a) and solution of compound of $M^1$ and/or $M^2$ are introduced simultaneously.

In one embodiment of the present invention, the volume ratio of nickel oxide/hydroxide/oxyhydroxide from step (a) and total solution of compound of $M^1$ and/or $M^2$ in step (b) is in the range of from 10:1 to 1:5, preferably from 10:1 to 1:1, even more preferably from 10:1 to 5:1.

Treatment of the nickel oxide/hydroxide with the solution of $M^1$ and/or $M^2$ may take place over a period of from 1 minute to 3 hours, preferably from 5 minutes to 1 hour, even more preferably from 5 to 30 minutes.

Step (b) may be supported by mixing operations, for example shaking or in particular by stirring or shearing, see below.

In one embodiment of the present invention, steps (b) and (c) are combined: In one embodiment of the present invention, step (b) is performed by slurrying said nickel oxide/hydroxide from step (a) in a solution containing $M^1$ followed by removal of the solvent by a solid-liquid separation method or by evaporation, step (c-1), and then re-slurrying the residue in a solution containing $M^2$, removing the respective solvent by a solid-liquid separation method or by evaporation, step (c-2), and drying at a maximum temperature in the range of from 50 to 450° C.

In another embodiment of the present invention, step (b) is performed by slurrying said nickel oxide/hydroxide from step (a) in a solution containing $M^2$ followed by removal of the solvent by a solid-liquid separation method or by evaporation, step (c-1), and then re-slurrying the residue in a solution containing $M^1$, removing the respective solvent by a solid-liquid separation method or by evaporation, step (c-2), and drying at a maximum temperature in the range of from 50 to 450° C.

In the optional step (c), solvent(s) is/are removed. Suitable embodiments of removal of solvents are solid-liquid separation methods, for example decanting and filtration, for example on a band filter or in a filter press.

In one embodiment of step (c), the slurry obtained in step (b) is discharged directly into a centrifuge, for example a decanter centrifuge or a filter centrifuge, or on a filter device, for example a suction filter or in a belt filter that is located preferably directly below the vessel in which step (b) is performed. Then, filtration is commenced.

In a particularly preferred embodiment of the present invention, steps (b) and (c) are performed in a filter device with stirrer, for example a pressure filter with stirrer or a suction filter with stirrer. At most 3 minutes after—or even immediately after—having combined starting material and solution(s) of $M^1$ and $M^2$ in accordance with step (b), removal of solvent is commenced by starting the filtration. On laboratory scale, steps (b) and (c) may be performed on a Büchner funnel, and steps (b) and (c) may be supported by manual stirring.

In a preferred embodiment, step (b) is performed in a filter device, for example a stirred filter device that allows stirring of the slurry in the filter or of the filter cake. By commencement of the filtration, for example pressure filtration or suction filtration, after a maximum time of 3 minutes after commencement of step (b), step (c) is started.

In one embodiment of the present invention, the solvent removal in accordance to step (c) has a duration in the range of from 1 minute to 1 hour.

In one embodiment of the present invention, stirring in step (b)—and (c), if applicable—is performed with a rate in the range of from 1 to 50 rounds per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ and/or moisture content, e.g., a carbon dioxide and/or moisture content in the range of from 0.01 to 500 ppm by weight, preferred are 0.1 to 50 ppm by weight. The $CO_2$ and/or moisture content may be determined by, e.g., optical methods using infrared light. It is even more preferred to perform steps (b) and (c) under an atmosphere with a carbon dioxide and/or moisture content below detection limit for example with infrared-light based optical methods.

In one embodiment of the present invention, step (c) is performed by evaporating the solvents, preferably under reduced pressure. Such embodiments are preferred when the solvent(s) are organic solvents, e.g., ethanol or isopropanol.

In one embodiment of the present invention the solvent of the wet nickel oxide/hydroxide, treated with solutions of $M^1$ and $M^2$, is not removed and the wet nickel oxide/hydroxide is directly mixed with the lithium source, step (d), to enable ideal distribution of lithium. This option is in particular interesting if only water is used as solvent for step (b).

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infrared-light based optical methods.

In one embodiment of the present invention, step (c) is performed by evaporating the solvents, preferably under reduced pressure. Such embodiments are preferred when the solvent(s) are organic solvents, e.g., ethanol or isopropanol.

A powdery residue is obtained from step (c) in embodiments wherein step (c) is performed.

In step (d), a source of lithium is added.

Examples of sources of lithium are $Li_2O$, LiOH, and $Li_2CO_3$, each water-free or as hydrate, if applicable, for example $LiOH \cdot H_2O$. Preferred example is lithium hydroxide.

The amounts of source of lithium and of powdery residue is selected in a way that the molar ratio of Li and TM is (1+x) to 1, with x being in the range of from 0.98 to 1.05.

Said source of lithium is preferable in particulate form, for example with an average diameter (D50) in the range of from 3 to 10 µm, preferably from 5 to 9 µm.

Examples of suitable apparatuses for performing step (d) are high-shear mixers, tumbler mixers, plough-share mixers and free fall mixers.

In one embodiment of the present invention, step (d) is performed at a temperature in the range of from ambient temperature to 200° C., preferably 20 to 50° C.

A mixture is obtained.

Step (e) includes subjecting said mixture to a thermal treatment. Examples of step (e) are heat treatments at a temperature in the range of from 600 to 800° C., preferably 650 to 750° C. The terms "treating thermally" and "heat treatment" are used interchangeably in the context of the present invention.

In one embodiment of the present invention, the mixture obtained from step (d) is heated to 600 to 800° C. with a heating rate of 0.1 to 10° C./min.

In one embodiment of the present invention, the temperature is ramped up before reaching the desired temperature of from 600 to 800° C., preferably 650 to 750° C. For example, first the mixture obtained from step (d) is heated to a temperature to 350 to 550° C. and then held constant for a time of 10 min to 4 hours, and then it is raised to 650° C. up to 800° C. and then held at 650 to 800 for 10 minutes to 10 hours.

In one embodiment of the present invention, step (e) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (e) is performed in an oxygen-containing atmosphere, for example in a nitrogen-air mixture, in a rare gas-oxygen mixture, in air, in oxygen or in oxygen-enriched air. In a preferred embodiment, the atmosphere in step (d) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (e) is performed under a stream of gas, for example air, oxygen and oxygen-enriched air. Such stream of gas may be termed a forced gas flow. Such stream of gas may have a specific flow rate in the range of from 0.5 to 15 $m^3/h \cdot kg$ material according to general formula $Li_{1-x}TM_{1-x}O_2$. The volume is determined under normal conditions: 298 Kelvin and 1 atmosphere. Said stream of gas is useful for removal of gaseous cleavage products such as water and carbon dioxide.

The inventive process may include further steps such as, but not limited, additional calcination steps at a temperature in the range of from 650 to 800° C. subsequently to step (e).

In one embodiment of the present invention, step (e) has a duration in the range of from one hour to 30 hours. Preferred are 10 to 24 hours. The time at a temperature above 600° C. is counted, heating and holding but the cooling time is neglected in this context.

A material is obtained that is excellently suitable as cathode active material for lithium ion batteries.

In one embodiment of the present invention, it is possible to treat inventive material with water and subsequently drying it. In another embodiment, it is possible to at least partially coat particles of inventive material, for example by mixing it with an oxide or hydroxide, for example with aluminum hydroxide or alumina or with boric acid, followed by thermal treatment at 150 to 400° C. In another embodiment of the present invention, it is possible to at least partially coat particles of inventive material by way of atomic layer deposition methods, for example by alternating treatment8s) with trimethylaluminum and moisture.

A further aspect of the present invention are electrodes comprising at least one inventive material. They are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain
(A) at least one inventive material, as described above,
(B) carbon in an electrically conductive state, and
(C) a binder,
(D) a current collector.

In a preferred embodiment of the present invention, inventive cathodes contain
(A) 80 to 98% by weight inventive material,
(B) 1 to 17% by weight of carbon,
(C) 1 to 10% by weight of binder material,
percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene.

Preference is given to polyacrylonitrile homopolymers.

In the context of the present invention, polyethylene is not only understood to mean homo-polyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homo-polypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_W$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 3 to 10% by weight of binder(s) (d), referring to the sum of component (a), component (b) and carbon (c).

A further aspect of the present invention is a battery, containing
(A) at least one cathode comprising inventive cathode active material (A), carbon (B), and binder (C),
(B) at least one anode, and
(C) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Nonaqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-C1-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_W$ of suitable polyalkylene glycols and in particular suitable polyethylene glycols can be at least 400 g/mol.

The molecular weight MW of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

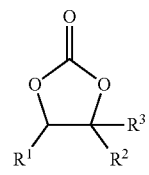

(II)

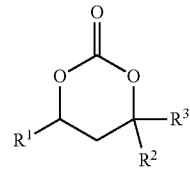

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

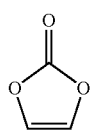

(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—P(O)(OCH$_3$)$_2$, triphenylphosphate, and tris-(2,2,2-trifluoro-ethyl)phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 45%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

BRIEF DESCRIPTION OF THE DRAWINGS

FIG. 1: Illustration of the calculation of the integral peak width $^{2nd\ charge}IPW_{4.1\ V-4.25\ V}$ of the second charge at 0.2 C-rate between 4.1 V and 4.25 V.

FIG. 2: Differential capacity plot (dQ)/(dV) of the second cycle of a coin half-cell containing C-CAM.1 and obtained by applying the cycling procedure listed in table 1.

FIG. 3: Differential capacity plot (dQ)/(dV) of the second cycle of a coin half-cell containing CAM.2 obtained by applying the cycling procedure listed in table 1.

FIG. 4: Differential capacity plot (dQ)/(dV) of the second cycle of a coin half-cell containing CAM.3 obtained by applying the cycling procedure listed in table 1.

FIG. 5: Differential capacity plot (dQ)/(dV) of the second cycle of a coin half-cell containing CAM.4 obtained by applying the cycling procedure listed in table 1.

FIG. 6: Differential capacity plot (dQ)/(dV) of the second cycle of a coin half-cell containing C-CAM.5 obtained by applying the cycling procedure listed in table 1.

FIG. 7: Capacity-cycle plot of a coin half-cell containing C-CAM.1 obtained by applying the cycling procedure listed in table 1.

FIG. 8: Capacity-cycle plot of a coin half-cell containing CAM.2 obtained by applying the cycling procedure listed in table 1.

FIG. 9: Capacity-cycle plot of a coin half-cell containing CAM.3 obtained by applying the cycling procedure listed in table 1.

FIG. 10: Capacity-cycle plot of a coin half-cell containing CAM.4 obtained by applying the cycling procedure listed in table 1.

FIG. 11: Capacity-cycle plot of a coin half-cell containing the inventive cathode active material C-CAM.5 obtained by applying the cycling procedure listed in table 1.

FIG. 12: Resistance-cycle plot of coin half-cells containing the comparative cathode active material C-CAM.1 and the inventive cathode active materials CAM.2, CAM.3, and CAM.4 obtained by applying the cycling procedure listed in table 1.

The present invention is further illustrated by working examples.

Average particle diameters (D50) were determined by dynamic light scattering ("DLS"). Percentages are % by weight unless specifically noted otherwise.

Step (a.1): A spherical $Ni(OH)_2$ precursor was obtained by combining aqueous nickel sulfate solution (1.65 mol/kg solution) with an aqueous 25 wt. % NaOH solution and using ammonia as complexation agent. The pH value was set at 12.6. The freshly precipitated $Ni(OH)_2$ was washed with water, sieved and dried at 120° C. for 12 hours. Subsequently, the freshly precipitated $Ni(OH)_2$ was poured into an alumina crucible and dried in a furnace under oxygen atmosphere (10 exchanges/h) at 500° C. for 3 hours using a heating rate of 3° C./min and a cooling rate of 10° C./min to obtain the precursor p-CAM.1. p-CAM.1 was NiO with a D50 of 6 μm.

Manufacture of a comparative cathode active material, C-CAM.1:

The dehydrated precursor p-CAM.1 was mixed with $LiOH.H_2O$ in a molar ratio of Li:Ni of 1.01:1, poured into a alumina crucible and heated at 350° C. for 4 hours and 700° C. for 6 hours under oxygen atmosphere (10 exchanges/h) using a heating rate of 3° C./min. The resultant material was cooled to ambient temperature at a cooling rate of 10° C./min and subsequently sieved using a mesh size of 30 μm to obtain comparative material C-CAM.1 with a D50 of 6 μm.

Manufacture of an inventive material, CAM.2:

Step (b.1.2): 100 g of the precursor p-CAM.1 were placed in a beaker. 0.98 g $Al(NO_3)_3$ nonahydrate and 0.32 g boric acid $H_3BO_3$ were dissolved in 35 ml deionized water. The resultant solution was added dropwise through a dropping funnel over 5 minutes at ambient temperature into the beaker until the precursor was soaked with liquid. No visible liquid film formed above the precursor p-CAM.1. The resultant slurry was stirred in the beaker over a period of 30 minutes. The individual amounts of Al, B and Ni were set to ensure a molar Ni:Al ratio of 0.991:0.002 and a molar Ni:B ratio of 0.991:0.004.

Step (c.1.2): Subsequently, the water was removed by heating the mixture for 6 hours at 120° C. under vacuum to obtain p-CAM.2.1.

Step (b.2.2): The p-CAM.2.1 obtained from (c.1.2) was placed in a beaker. 1.24 g niobium(V) ethoxide were dissolved in 28 ml dry ethanol. The resultant solution was added dropwise through a dropping funnel over 5 minutes at ambient temperature into the beaker until the precursor was soaked with liquid. No visible liquid film formed above the precursor p-CAM.2.1. The resultant slurry was stirred in the beaker over a period of 30 minutes. Step (b.2.2) was performed under a nitrogen atmosphere. The individual amounts of Nb and Ni were set to ensure a molar Ni:Nb ratio of 0.991:0.003.

Step (c.2.2): Subsequently the ethanol was removed by heating the slurry for 6 hours at 120° C. under vacuum to obtain p-CAM.2.2.

Steps (d.1.2) and (e.1.2): Precursor p-CAM.2.2 was mixed with $LiOH.H_2O$ in a molar ratio of Li:(Ni+Nb+B+Al) of 1.01:1, poured into an alumina crucible and heated at 350° C. for 4 h and 700° C. for 6 hours under oxygen atmosphere (10 exchanges/h) with a heating rate of 3° C./min and a cooling rate of 10° C./min. The material so obtained was subsequently sieved using a mesh size of 30 μm to obtain inventive cathode active material CAM.2.

D50: 6 μm.

Manufacture of an inventive material CAM.3:

Step (b.1.3): 100 g of the precursor p-CAM.1 were placed in a beaker. 1.80 g $Ga(NO_3)_3$ nitrate and 0.52 g ammonium heptamolybdate, $(NH_4)_6Mo_7O_{24}$, were dissolved in 35 ml deionized water. The resultant solution was added dropwise through a dropping funnel over 5 minutes at ambient temperature into the beaker until the precursor was soaked with liquid. No visible liquid film formed above the precursor p-CAM.1. The resultant slurry was stirred in the beaker over a period of 30 minutes. The individual amounts of Ga, Mo and Ni were set to ensure a molar Ni:Mo ratio of 0.991:0.002 and a molar Ni:Ga ratio of 0.991:0.004.

Step (c.1.3): Subsequently, the water was removed by heating the slurry for 6 hours at 120° C. under vacuum to obtain p-CAM.3.1.

Step (b.2.3): The p-CAM.3.1 obtained from (c.1.3) was placed in a beaker. 1.60 g tantalum(V) ethoxide were dissolved in 28 ml dry ethanol. The resultant solution was added dropwise through a dropping funnel over 5 minutes at ambient temperature into the beaker until the precursor was soaked with liquid. No visible liquid film formed above the precursor p-CAM.3.1. The resultant slurry was stirred in the beaker over a period of 30 minutes. Step (b.2.3) was performed under nitrogen atmosphere. The individual amounts of Ta and Ni were set to ensure a molar Ni:Ta ratio of 0.991:0.003.

Step (c.2.3): Subsequently the ethanol was removed by heating the slurry for 6 hours at 120° C. under vacuum to obtain the impregnated p-CAM.3.2.

Steps (d.3) and (e.3): Precursor p-CAM.3.2 was mixed with $LiOH.H_2O$ in a molar ratio of Li:(Ni+Ta+Ga+Mo) of 1.01:1, poured into an alumina crucible and heated at 350° C. for 4 h and 700° C. for 6 hours under oxygen atmosphere (10 exchanges/h) with a heating rate of 3° C./min and a cooling rate of 10° C./min. The material so obtained was subsequently sieved using a mesh size of 30 μm to obtain inventive CAM.3. with a D50 of 6 μm.

Manufacture of an inventive material CAM.4:

Step (b.1.4) and step (c.1.4): 0.68 g magnesium nitrate and 3.22 g ammonium zirconium (IV) carbonate were dissolved in 100 ml deionized water. The solution was filled into a dropping funnel and added dropwise over 5 minutes at ambient temperature onto an amount of 100 g of precursor p-CAM.1 which was placed in a beaker until the precursor was soaked with liquid but before a visible liquid film formed above the precursor p-CAM.1. During this procedure the precursor p-CAM.1 was stirred in the beaker over a period of 30 minutes. Subsequently, the water was removed by heating the slurry for 6 hours at 120° C. under vacuum. The residual solution of magnesium and zirconium was added to the dried pCAM under similar conditions as listed above until the precursor was completely soaked with liquid again, but before a visible liquid film formed. Subsequently, the water was removed by heating the mixture again for 6 hours at 120° C. under vacuum. This procedure was repeated until all solution of zirconium and magnesium was consumed. After the final drying at 120° C. for 6 h, p-CAM.4.1 was obtained. The individual amounts of Mg and Zr and Ni were set to ensure a molar Ni:Mg ratio of 0.991:0.002 and a molar Ni:Zr ratio of 0.991:0.004.

Step (b.2.4): The p-CAM.4.1 obtained from (c.1.4) was placed in a beaker. 1.12 g titanium(IV)-isopropoxide were dissolved in 28 ml dry ethanol. The resultant solution was added dropwise through a dropping funnel over 5 minutes at ambient temperature into the beaker until the precursor was soaked with liquid. No visible liquid film formed above the precursor p-CAM.4.1. The resultant slurry was stirred in the beaker over a period of 30 minutes. Step (b.2.4) was completely performed under nitrogen atmosphere. The individual amounts of Ti and Ni were set to ensure a molar Ni:Ti ratio of 0.991:0.003.

Step (c.2.4): Subsequently the ethanol was removed by heating the mixture for 6 hours at 120° C. under vacuum to obtain the impregnated p-CAM.4.2.

Steps (d.4) and (e.4): Precursor p-CAM.4.2 was mixed with LiOH.H$_2$O in a molar ratio of Li:(Ni+Mg+Ti+Zr) of 1.01:1, poured into an alumina crucible and heated at 350° C. for 4 h and 700° C. for 6 hours under oxygen atmosphere (10 exchanges/h) with a heating rate of 3° C./min and a cooling rate of 10° C./min. The material so obtained was subsequently sieved using a mesh size of 30 μm to obtain inventive CAM.4. with a D50 of 6 μm.

Manufacture of a comparative cathode active material, C-CAM.5:

Step C-(b.1.5): 100 g of the precursor p-CAM.1 were placed in a beaker. 6.54 g cobalt (II) nitrate were dissolved in 35 ml deionized water. The resultant solution was added dropwise through a dropping funnel over 5 minutes at ambient temperature into the beaker until the precursor was soaked with liquid. No visible liquid film formed above the precursor. The resultant slurry was stirred in the beaker over a period of 30 minutes. The individual amounts of Co and Ni were set to ensure a molar ratio of Ni:Co of 0.98:0.02.

Step C-(c.1.5): Subsequently, the water was removed by heating the mixture for 6 hours at 120° C. under vacuum to obtain comparative precursor p-CAM.5.

Steps C-(d.1.5) and (e.1.5): comparative precursor C-p-CAM.5 was mixed with LiOH.H2O in a molar ratio of Li:(Ni+Co) of 1.01:1, poured into an alumina crucible and heated at 350° C. for 4 h and 700° C. for 6 hours under oxygen atmosphere (10 exchanges/h) with a heating rate of 3° C./min and a cooling rate of 10° C./min. The material so obtained was subsequently sieved using a mesh size of 30 μm to obtain comparative cathode active material C-CAM.5. with a D50 of 6 μm.

Electrode manufacture: Electrodes contained 94% CAM, 3% carbon black (Super C65) and 3% binder (polyvinylidene fluoride, Solef 5130). Slurries were mixed in N-methyl-2-pyrrolidone and cast onto aluminum foil by doctor blade. After drying of the electrodes 6 h at 105° C. in vacuo, circular electrodes were punched, weighed and dried at 120° C. under vacuum for 12 hours before entering in an Ar filled glove box.

Half-Cell Electrochemical Measurements: Coin-type electrochemical cells, were assembled in an argon-filled glovebox. The positive 14 mm diameter (loading 8.0±0.5 mg cm$^{-2}$) electrode was separated from the 0.58 thick Li foil by a glass fiber separator (Whatman GF/D). An amount of 95 μl of 1 M LiPF$_8$ in ethylene carbonate (EC): ethylmethyl carbonate (EMC), 3:7 by weight, was used as the electrolyte. Cells were galvanostatically cycled at a Maccor 4000 battery cycler between 3.1 and 4.3 V at room temperature by applying the following C-rates until 70% of the initial discharge capacity is reached at a certain discharge step:

TABLE 1

Electrochemical test procedure of the coin half cells.

| | Charge | Discharge |
|---|---|---|
| Cycle 1 | 0.1 C | 0.1 C |
| Cycle 2-6 | 0.2 C + CV* | 0.2 C |
| Cycle 7 & 8 | 0.5 C + CV* | 0.5 C |
| Cycle 9 & 10 | 0.5 C + CV* | 2.0 C |
| Cycle 11 & 12 | 0.5 C + CV* | 3.0 C |
| Cycle 13 & 14 | 0.5 C + CV* | 0.5 C |
| Cycle 15 | | Resistance measurement |
| Cycle 16-40 | 0.5 C + CV* | 1.0 C |
| Cycle 41 + 42 | 0.5 C + CV* | 0.5 C |
| Cycle 43 | | Resistance measurement |
| Cycle 44-68 | 0.5 C + CV* | 1.0 C |
| Cycle 69 + 70 | 0.5 C + CV* | 0.5 C |
| Cycle 71 | | Resistance measurement |
| Cycle 72-96 | 0.5 C + CV* | 1.0 C |
| Cycle 97 + 98 | 0.5 C + CV* | 0.5 C |
| Cycle 99 | | Resistance measurement |
| Cycle 100-124 | 0.5 C + CV* | 1.0 C |
| Cycle 125 + 126 | 0.5 C + CV* | 0.5 C |
| Cycle 127 | | Resistance measurement |
| Cycle 128-152 | 0.5 C + CV* | 1.0 C |
| Cycle 153 + 154 | 0.5 C + CV* | 0.5 C |
| Cycle 155 | | Resistance measurement |
| Cycle 156-180 | 0.5 C + CV* | 1.0 C |
| Cycle 181 + 182 | 0.5 C + CV* | 0.5 C |
| Cycle 183 | | Resistance measurement |
| Cycle 184-208 | 0.5 C + CV* | 1.0 C |

After charging at the listed C-rates, all charge step except the first were finished by a constant voltage step (CV*) for 1 h, or until the current reached 0.02 C.

During cycling, data points were collected every 1 minute or after voltage changes of at least 5 mV occurred. 4 electrochemical cells were assembled for each of the materials, the corresponding cycling profile, capacity and resistance was obtained by averaging the 4 cells.

During the resistance measurement (conducted every 25 cycles at 25 C), the cell was charged at 0.2 C to reach 50% state of charge, relative to the previous discharge capacity. To equilibrate the cell, a 30 min open circuit step followed. Finally, a 2.5 C discharge current was applied for 30 s to measure the resistance. At the end of the current pulse, the cell was again equilibrated for 30 min in open circuit and further discharged at 0.2 C to 3 0.0 V.

To calculate the resistance, the voltage before applying the 2.5 C pulse current, V0s, and after 30 s of 2.5 C pulse current, V30 s, as well as the 2.5 C current value, (0 in A), were taken. The resistance was calculated according to Eq. 3 (V: voltage, j: 2.5 C pulse current).

$$R=(V0s-V30s)/j \qquad \text{(Eq. 3)}$$

TABLE 2

Composition and electrochemical properties of comparative cathode active material C-CAM.1 and C-CAM.5 and inventive cathode active materials CAM.2, CAM.3, and CAM.4

| | C-CAM.1 | CAM.2 | CAM.3 | CAM.4 | C-CAM.5 |
|---|---|---|---|---|---|
| $2nd\ charge$IPW$_{4.1\ V-4.25\ V}$ [mv] | 17.1 | 40.5 | 49.1 | 51.0 | |
| Discharge capacity in cycle 5 [mAh/g] | 203 | 210 | 203 | 203 | 208 |
| Discharge capacity in cycle 25 [mAh/g] | 163 | 187 | 182 | 185 | 130 |
| Discharge capacity in cycle 50 [mAh/g] | 139 | 171 | 168 | 173 | n.d. |
| Discharge capacity in cycle 100 [mAh/g] | — | 155 | 152 | 158 | n.d. |

TABLE 2-continued

Composition and electrochemical properties of comparative cathode active material C-CAM.1 and C-CAM.5 and inventive cathode active materials CAM.2, CAM.3, and CAM.4

|  | C-CAM.1 | CAM.2 | CAM.3 | CAM.4 | C-CAM.5 |
|---|---|---|---|---|---|
| resistance in cycle 15 [Ω] | 23 | 16 | 16 | 19 | 22 |
| resistance in cycle 43 [Ω] | 36 | 20 | 22 | 19 | n.d. |
| resistance in cycle 99 [Ω] | — | 26 | 29 | 22 | n.d. | n.d.: not determined

The invention claimed is:

1. A particulate material of the composition $Li_{1+x}TM_{1-x}O_2$ wherein:
x ranges from −0.02 to +0.05,
TM comprises at least 93 mol −% nickel, and
(A) at least one element $M^1$ chosen from Nb, Ta, Ti, Zr, W, and Mo,
(B) at least one element $M^2$ chosen from B, Al, Mg and Ga;
wherein the particulate material has an average particle diameter (D50) ranging from 2 μm to 20 μm.

2. The particulate material according to claim 1, wherein TM is a combination of metals according to general formula (I)

$$(Ni_aM^1{}_bM^2{}_c)_{1-d}M^3{}_d \quad (I)$$

wherein
$M^3$ is chosen from Mn and Co,
a ranges from 0.95 to 0.995,
b ranges from 0.002 to 0.04,
c ranges from 0.002 to 0.02, and
d ranges from zero to 0.02,
a+b+c=1.

3. The particulate material according to claim 1, wherein d is zero.

4. The particulate material according to claim 1, wherein $M^1$ is Zr or Ti and $M^2$ is Al.

5. The particulate material according to claim 1, wherein $M^1$ is Ta or Nb and $M^2$ is Al or B.

6. The particulate material according to claim 1, wherein the material has an integral peak width, $^{2nd\ charge}IPW_{4.1-4.25}$ v, in the differential capacity plot, (dQ)/(dV), of at least 25 mV between 4.1 V and 4.25 V in the second charge cycle at 0.2 C-rate.

7. The particulate material according to claim 1, wherein the material is coated with a metal oxide.

8. The particulate material according to claim 1, wherein b≤c.

9. A process for manufacturing a particulate material according to claim 1, wherein the process comprises the following steps:
(a) providing a particulate nickel hydroxide, nickel (II) oxide or nickel oxyhydroxide,
(b) treating the nickel oxide/hydroxide or oxyhydroxide with one or two solutions of compounds of $M^1$ and $M^2$,
(c) optionally, removing the solvent(s) from step (b),
(d) adding a source of lithium, and
(e) treating the mixture obtained from step (d) thermally.

10. The process according to claim 9, wherein step (e) is performed at a maximum temperature ranging from 650° C. to 750° C.

11. The process according to claim 9, wherein step (c) is performed by a solid-liquid separation method.

* * * * *